(12) United States Patent
Kim et al.

(10) Patent No.: US 7,634,030 B2
(45) Date of Patent: *Dec. 15, 2009

(54) DATA TRANSMISSION APPARATUS FOR DS/CDMA SYSTEM EQUIPPED WITH MIMO ANTENNA SYSTEM

(75) Inventors: Seong Rag Kim, Daejon (KR); Young Ho Jung, Busan (KR); In-Kyeong Choi, Daejon (KR); Yong Hoon Lee, Daejon (KR)

(73) Assignees: Electronics and Telecommunications, Daejon (KR); Research Institute - and - Korea Advanced Institute of Science and Technology, Daejon (KR)

( * ) Notice: Subject to any disclaimer, the term of this patent is extended or adjusted under 35 U.S.C. 154(b) by 654 days.

This patent is subject to a terminal disclaimer.

(21) Appl. No.: 10/334,634

(22) Filed: Dec. 31, 2002

(65) Prior Publication Data
US 2004/0105489 A1 Jun. 3, 2004

(30) Foreign Application Priority Data
Oct. 22, 2002 (KR) .................. 10-2002-0064674

(51) Int. Cl.
*H04L 27/06* (2006.01)
(52) U.S. Cl. ................. 375/341; 375/140; 375/147; 375/148; 375/219; 375/267; 375/346; 375/347
(58) Field of Classification Search ............ 375/136, 375/140, 142–144, 147–148, 152, 153, 208, 375/209–210, 316, 347, 350, 229, 231–233, 375/259, 130, 267, 299, 341, 321–233; 370/320, 370/342, 335, 203, 290, 310, 441, 431; 380/268, 380/252, 255; 455/500–501, 504, 506, 130, 455/132, 137, 101
See application file for complete search history.

(56) References Cited

U.S. PATENT DOCUMENTS 5,268,927 A 12/1993 Dimos et al.
6,069,912 A * 5/2000 Sawahashi et al. .......... 375/142

(Continued)

OTHER PUBLICATIONS

Nicol et. al., "Integrated Circuits for 3GPP Mobile Wireless System", IEEE Custom Integrated Circuits Conference May 2002.*
3GPP TR 25.848 V 4.0.0. (Mar. 2001, section 6.5 "Multiple Input Output Antenna Processing" p. 16-17.*
3GPP TR 25.848(Mar. 2001) (pp. 16-17).*
Latva-aho et. al., "LMMSE Detection for DS-CDMA Systems in Fading Channels", IEEE 2000.*
Nicol et. al., "Integrated Circuits for 3GPP Mobile Wireless Systems", IEEE, May 2002 .*
Gaspa et al. "Comparison of different MIMO strategies for the downlink TDD mode of UTRA" ICT Jun. 2001.*

(Continued)

*Primary Examiner*—Mohammad H Ghayour
*Assistant Examiner*—Sophia Vlahos
(74) *Attorney, Agent, or Firm*—Blakely Sokoloff Taylor & Zafman

(57) ABSTRACT

A transmission apparatus for a DS/CDMA system including a multiple-input multiple output MIMO antenna system is disclosed. The apparatus includes a transmitter for transmitting data by applying a different scramble code to each transmitted data through a plurality of transmitting antennas. The apparatus also includes a receiver for receiving the transmitted data by obtaining a diversity gain based on the maximum order of the diversity in order to effectively detect the data. The present invention achieves an excellent detection performance by receiving data with a full order of diversity, which is a multiple of the number of receiving antennas and the number of multipath, without complicated operation such as a decision feed equalizer.

2 Claims, 12 Drawing Sheets

U.S. PATENT DOCUMENTS

| | | | |
|---|---|---|---|
| 6,127,971 A | 10/2000 | Calderbank et al. | |
| 6,185,258 B1 | 2/2001 | Alamouti et al. | |
| 6,570,863 B1* | 5/2003 | Kim et al. | 370/342 |
| 6,657,590 B2* | 12/2003 | Yoshida | 342/383 |
| 6,839,379 B1* | 1/2005 | Horng et al. | 375/148 |
| 6,862,314 B1* | 3/2005 | Jurgensen et al. | 375/142 |
| 6,977,910 B1* | 12/2005 | Hosur et al. | 370/318 |
| 7,039,094 B2* | 5/2006 | Kim et al. | 375/147 |
| 2002/0196842 A1* | 12/2002 | Onggosanusi et al. | 375/148 |
| 2004/0001426 A1* | 1/2004 | Mailaender et al. | 370/203 |
| 2004/0014429 A1* | 1/2004 | Guo | 455/73 |
| 2004/0160921 A1* | 8/2004 | Kaipainen et al. | 370/335 |

OTHER PUBLICATIONS

Kim et al. "A constrained MMSE Receiver for DS/CDMA systems in Fading Channels", IEEE Nov. 2000.*

IEEE Journal on Selected Areas in Communications, vol. 16, No. 8, Oct. 1998, pp. 1451-1458, "A simple Transmit Diversity Technique for Wireless Communications", S. Alamouti.

IEEE Journal on Selected Areas in Communications, vol. 17, No. 3, Mar. 1999, pp. 451-460, "Space-Time Block Coding for Wireless Communications: Performance Results", V. Tarokh et al.

IEEE Signal Processing Magazine, vol. 17, No. 3, May 2000 pp. 76-92, "Increasing Data Rate over Wireless Channels", Naguib et al.

* cited by examiner

DATA TRANSMISSION APPARATUS FOR DS/CDMA SYSTEM EQUIPPED WITH MIMO ANTENNA SYSTEM

FIELD OF THE INVENTION

The present invention relates to a Direct Sequence DS/Code Division Multiple Access (CDMA) communication system equipping a multiple-input multiple-output (MIMO) antenna; and, more particularly, to a data transmission apparatus for detecting a transmission data by linear operation of receiving data with a diversity gain of a theoretical maximum order of receiving diversity for the CDMA system equipping MIMO antenna in frequency selective fading channels.

DESCRIPTION OF RELATED ARTS

Conventional data transmission apparatus and methods for simultaneously transmitting multiple data by using a plurality of transmission antennas are introduced by G. J Foschini et al. in "Simplified processing for high spectral efficiency wireless communication employing multi-element arrays," IEEE J. Selet. Areas Commun., vol. 17, pp. 1841-1852, November 1999 (Hereinafter Foschini).

Foschini teaches a V-BLAST method as a receiving method for receiving transmitted data from a plurality of transmitting antennas by increasing an order of diversity in order from data having bigger signal-to-noise ratio with a plurality of receiving antennas in a time division multiple access (TDMA) or frequency division multiple access (FDMA) system within a frequency flat fading environment. In this method, the number of receiver antennas should be larger than the number of transmitter antennas. The V-BLAST receiving method uses the concept that channel weights between the transmitting antennas and the receiving antennas are independent. Generally, the receiver detects data based on [the number of receiving antennas+(1−the number of transmitting antennas)/2] orders of receiving diversity.

In the mean time, general adaptive interference control methods for receiving antenna system are disclosed by S. C. Hong, J. H. Choi, S. R. Kim and Y. H. Lee, in "Constrained MMSE-RAKE receivers for DS/CDMA systems in frequency selective fading channels," in Proc. VTC'02 spring, May 2002.

For using a concept of the V-BLAST receiving method in a code division multiple access (CDMA) system, H. Huang et al. introduce another transmission apparatus and method in "Achieving high data rates on the UMTS downlink shared channel using multiple antennas," in Proc. International Conference on 3G Mobile Communication Technologies, March 2001 (Hereinafter Huang). Huang's method is considered a standard transmission method for high speed data transmission in the $3^{rd}$ generation mobile communication standard at 3GPP TR 25.848 (V 4.0.0), Physical layer aspects of UTRA High Speed Downlink Packet Access (Release 4), March 2001 (Hereinafter 3GPP). Huang's transmitting method simultaneously transmits multiple data sequences by spreading the data sequences, which are orthogonal to each others. After spreading the data sequences, they are scrambled using a scramble code that maintains the orthogonality between spread data.

The transmitting and receiving methods introduced by Huang and Foschini are designed and developed for frequency flat fading environments and cannot obtain full order of diversity. For frequency selective fading channels, A. Lozano and C. Papadias introduced a V-BLAST receiver combined with decision feedback equalizer (DFE) in "Space-time receiver for wideband BLAST in rich scattering wireless channels," in Proc. IEEE VTC'00, Japan, May 2000 (Hereinafter Lozano) and a similar method to Lozano's is also announced by Xu Zhu and R. D. Murch in "MIMO-DFE based BLAST over frequency selective fading channels," in Proc. GLOBECOM''01, November 2001 (Hereinafter XU). The methods of Lazano and XU implement the V-BLAST receiving method of Foschini by using the DFE for gathering multipath energy in a time division multiple access system.

In the code division multiple access (CDMA) system, the decision feedback equalizer may be impossible to use because of a chip unit signal which has comparatively low signal-to-noise ratio (SNR) and high implementation complexity. Therefore, no receiving method has been introduced for DS/CDMA systems equipped with MIMO antennas in a frequency selective fading channel environment.

SUMMARY OF THE INVENTION

It is, therefore, an object of the present invention to provide a transmission system for a direct sequence/code division multiple access (DS/CDMA) system using a multiple-input multiple-output (MIMO) antenna.

It is another object of the present invention to provide a transmitting system in a frequency selective fading environment for the DS/CDMA system equipped with a MIMO antenna by applying different scramble codes to each transmitting data according to the corresponding transmitting antenna.

It is still another object of the present invention to provide a receiving system in a frequency selective fading environment for the DS/CDMA system equipped with a MIMO antenna by obtaining diversity gain of a maximum order of diversity to effectively detect data.

In accordance with an aspect of the present invention, there is provided a transmitting apparatus for a direct sequence (DS)/code division multiple access (CDMA) equipped with a multiple-input multiple-output antenna system, including: a serial to parallel converting unit for converting serially inputted high speed data to a parallel data sequence; a spreading unit for generating spread data by spreading the parallel data sequence based on a spreading code, which is orthogonal to the parallel data sequence; a pilot signal generating unit for generating a pilot signal; a combining unit for generating combined data by combining the spread data and the pilot signal; a scrambling unit for scrambling the combined data by using different scrambling codes in order to generate scrambled data; and a plurality of transmitting antennas for independently transmitting the scrambled data.

In accordance with an aspect of the present invention, there is also provided a receiving apparatus for a direct sequence (DS)/code division multiple access (CDMA) system equipped with a multiple-input multiple-output antenna system, including: a plurality of receiving antennas for receiving a signal transmitted from a transmitter; a matched filtering unit for correlated the received signal with channel weights to generate a correlated signal; an input signal generating unit for gathering transmitted data in the correlated signal and outputting the gathered transmitted data; a plurality of de-spreading units, the number of which is linearly proportional to the number of paths in multipath for gathering energy, the number of transmitting antennas in the transmitter and the number of spreading codes for computing a scalar product value of a spreading code and a scramble code in the transmitted data; a channel estimating unit including a plurality of channel estimators (the number of estimators equal to the number of receiving antennas) for estimating channels based on a pilot signal from the de-spreading unit; a combining unit for gathering energies of transmitted data by using an output of the de-spreading unit and the channel estimating unit; and a data deciding unit for deciding an estimation value of a transmitted symbol by using the combined signal from the combining unit.

In accordance with another aspect of the present invention, there is also provided a receiving apparatus for a direct sequence (DS)/code division multiple access (CDMA) equipped with a multiple-input multiple-output antenna system, including: a plurality of receiving antennas for receiving a signal transmitted from a transmitter; an input signal generating unit for gathering transmitted data from the received signal and outputting the gathered transmitted data; an adaptive filtering unit for filtering a complex received signal according to a tap weight which is controlled in a predetermined cycle, and outputting filtered data; a channel estimating unit for estimating a phase and an amplitude of a channel between one of the transmitting antennas and one of the receiving antennas based on the filtered data and outputting an estimation data as a result of the estimation; a signal recovering unit for recovering the received signal from the original signal by combining the estimation data and filtered data with all components of multipath; a selecting unit for selecting one of the original signal and a training data signal supplied by the receiver and outputting the selected signal; an error calculating unit for calculating error between the filtered data and the selected signal by comparing the filtered data and the selected signal; and a tap weight controlling unit for controlling the tap weight of the adaptive filtering unit based on a constraint MMSE criterion having at least one condition.

In accordance with still another aspect of the present invention, there is also provided a transmission apparatus for a direct sequence (DS)/code division multiple access (CDMA) system equipped with a multiple-input multiple-output antenna system, including: a serial to parallel converting unit for converting serially inputted high speed data to a parallel data sequence; a spreading unit for generating spread data by spreading the parallel data sequence based on a spreading code which is orthogonal to the parallel data sequence; a pilot signal generating unit for generating a pilot signal; a combining unit for generating combined data by combining the spread data and the pilot signal; a scrambling unit for scrambling the combined data by using a different scrambling code in order to generate scrambled data; a plurality of transmitting antennas for independently transmitting the scrambled data; a plurality of receiving antennas for receiving the scrambled data as an analog signal transmitted from a plurality of the transmitting antennas; a matched filtering unit for filtering the analog signal to generate a digital signal; an input signal generating unit for gathering transmitted data in the digital signal and outputting the gathered transmitted data; a plurality of de-spreading units, the number of which is linearly proportional to the number of paths in multipath for gathering energy, the number of transmitting antennas in the transmitter and the number of spreading codes for computing an scalar product value of a spreading code and a scramble code in the transmitting data; a channel estimating unit including a plurality of channel estimators (the number of estimators equal to the number of the receiving antennas) for estimating channels based on a pilot signal from the de-spreading unit; a combining unit for gathering energies of transmitted data by using an output of the de-spreading unit and the channel estimating unit; and a data deciding unit for deciding an estimation value of a transmitted symbol by using the combined signal from the combining unit.

In accordance with a further still aspect of the present invention, there is also provided a transmission apparatus for a direct sequence (DS)/code division multiple access (CDMA) system equipped with a multiple-input multiple-output antenna system, including: a serial to parallel converting unit for converting serially inputted high speed data to a parallel data sequence; a spreading unit for generating spread data by spreading the parallel data sequence based on a spreading code, which is orthogonal to the parallel data sequence; a pilot signal generating unit for generating a pilot signal; a combining unit for generating combined data by combining the spread data and the pilot signal; a scrambling unit for scrambling the combined data by using different scrambling codes in order to generate scrambled data; a plurality of transmitting antennas for independently transmitting the scrambled data; a plurality of receiving antennas for receiving the scrambled data transmitted from the transmitting antennas; an input signal generating unit for gathering transmitted data in the received signal and outputting the gathered transmitted data; an adaptive filtering unit for filtering a complex received signal according to a tap weight which is controlled in a predetermined cycle and outputting filtered data; a channel estimating unit for estimating a phase and an amplitude of a channel between one of the transmitting antennas and one of the receiving antennas based on the filtered data and outputting an estimation data as a result of estimation; a signal recovering unit for recovering the original signal from the received signal by combining the estimation data and filtered data with all components of multipath; a selecting unit for selecting one of the original signal and a training data signal supplied by the receiver and outputting a selected signal; an error calculating unit for calculating error between the filtered data and the selected signal by comparing the filtered data and the selected signal; and a tap weight controlling unit for controlling the tap weight of the adaptive filtering unit based on a constraint MMSE criterion having at least one condition.

BRIEF DESCRIPTION OF THE DRAWING(S)

The above and other objects and features of the present invention will become apparent from the following description of the preferred embodiments given in conjunction with the accompanying drawings, in which.

Figure 3:
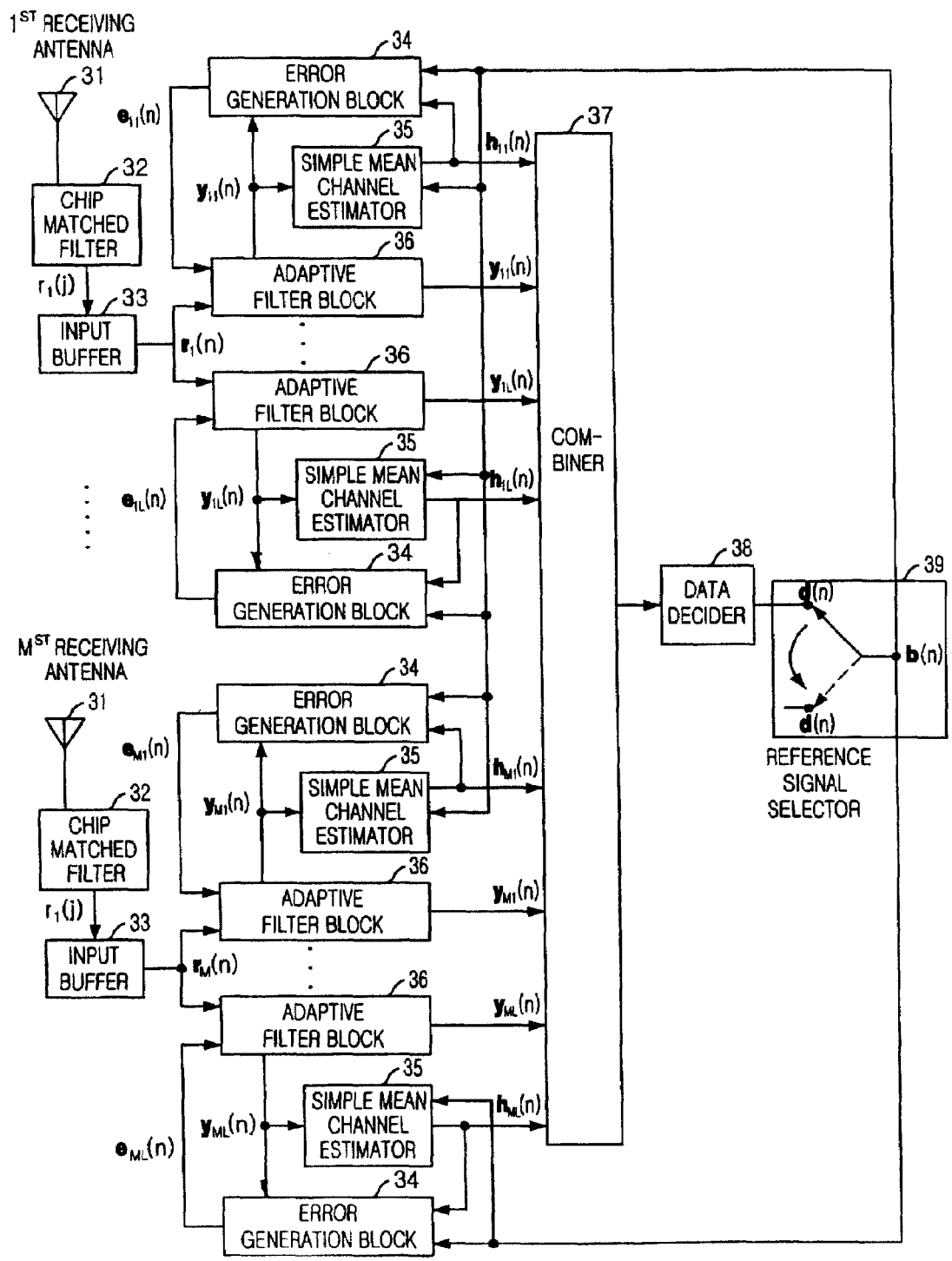
FIG. 3 is a diagram depicting a receiver in accordance with another embodiment of the present invention.
Figure 4:
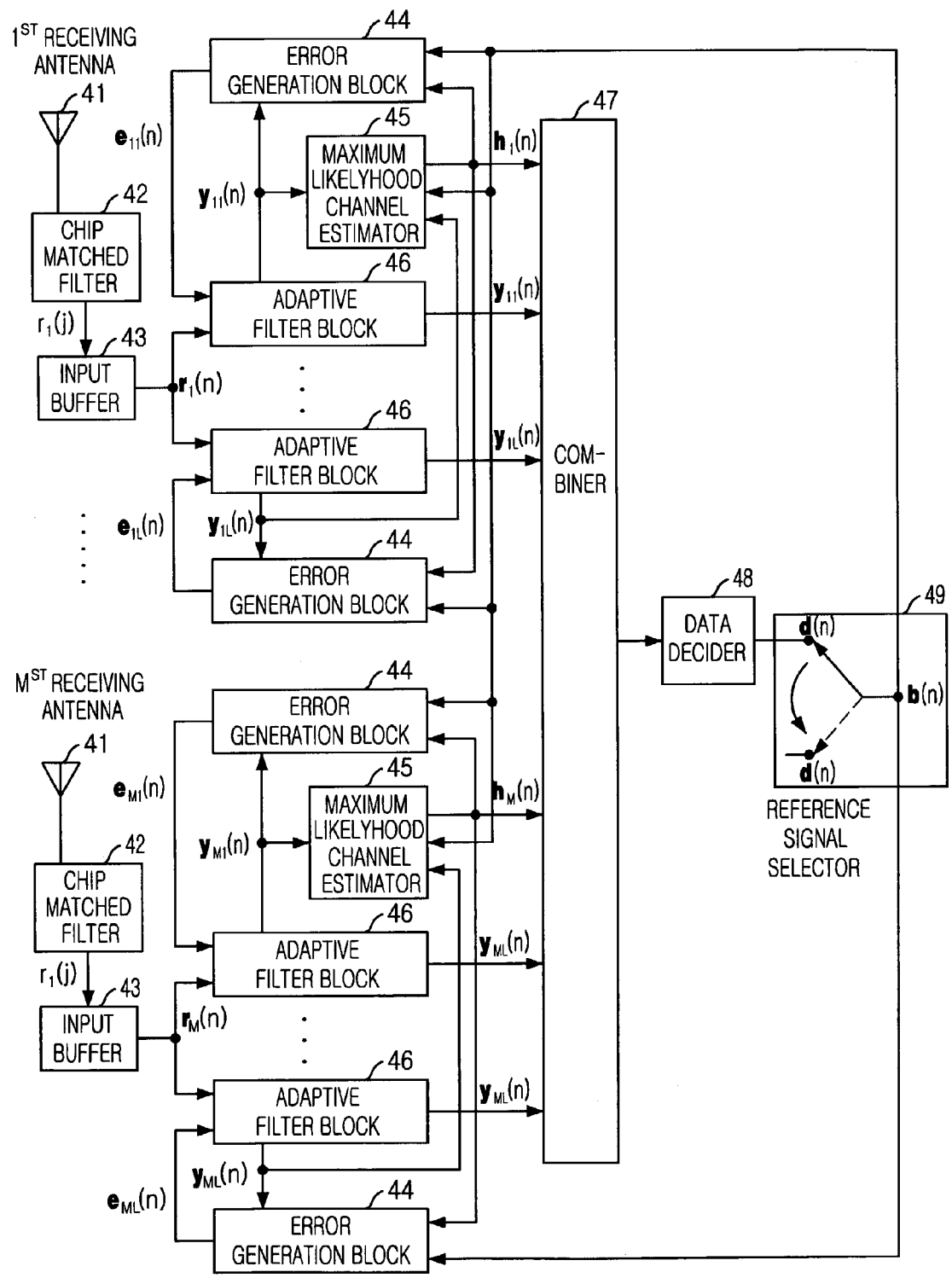
FIG. 4 is a diagram showing a receiver in accordance with another preferred embodiment of the present invention.
Figure 5:
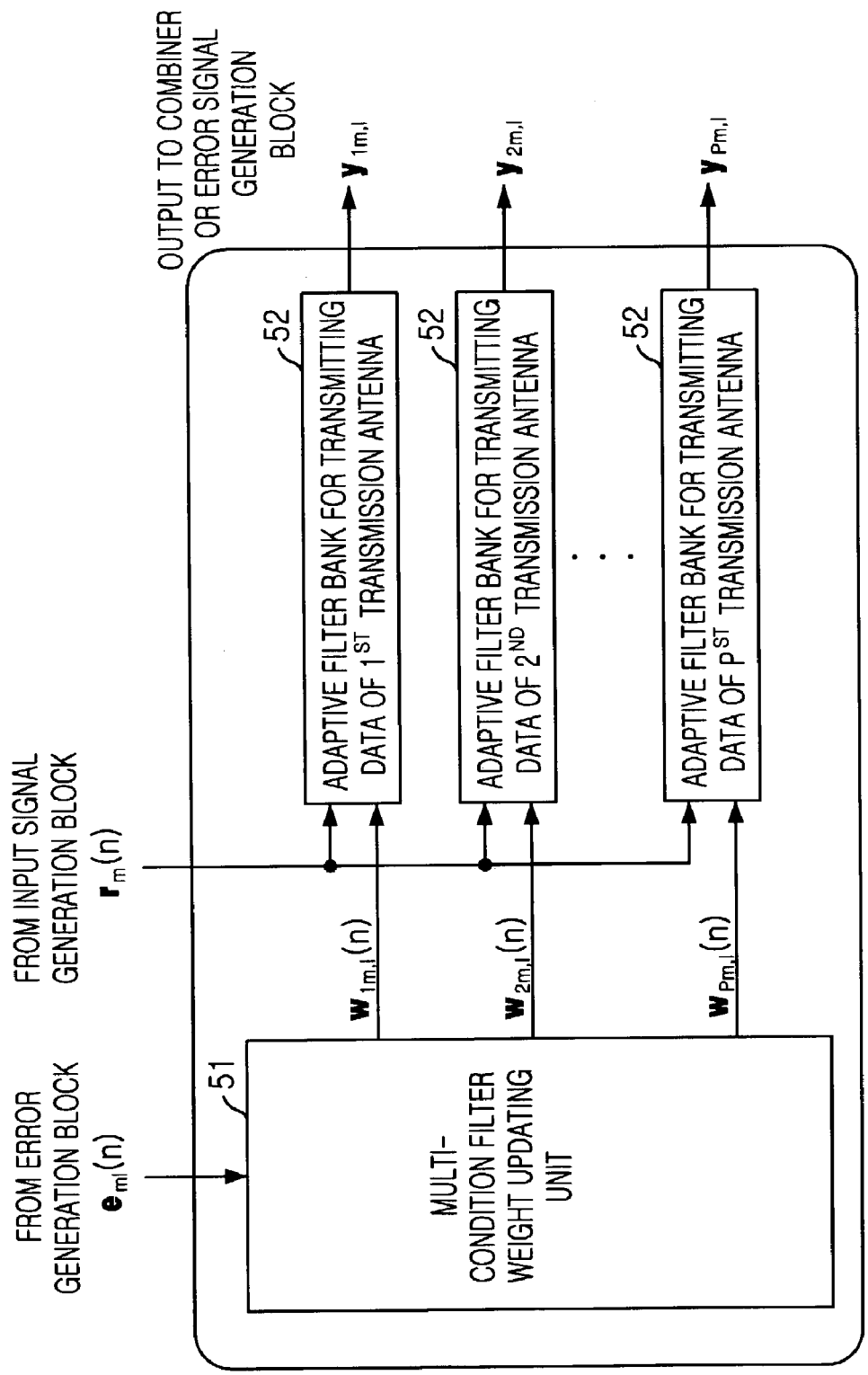
Figure 6:
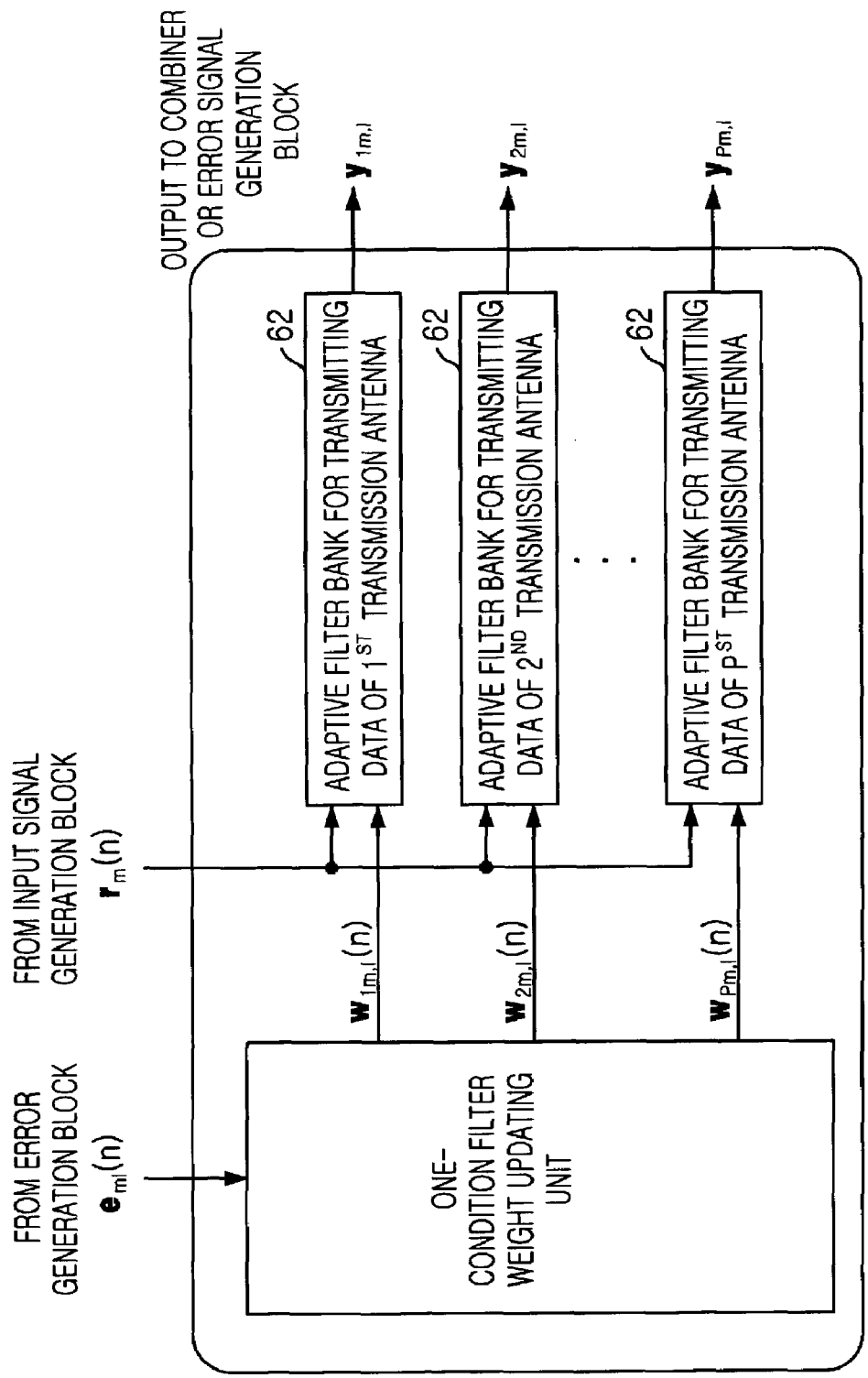
Figure 7:
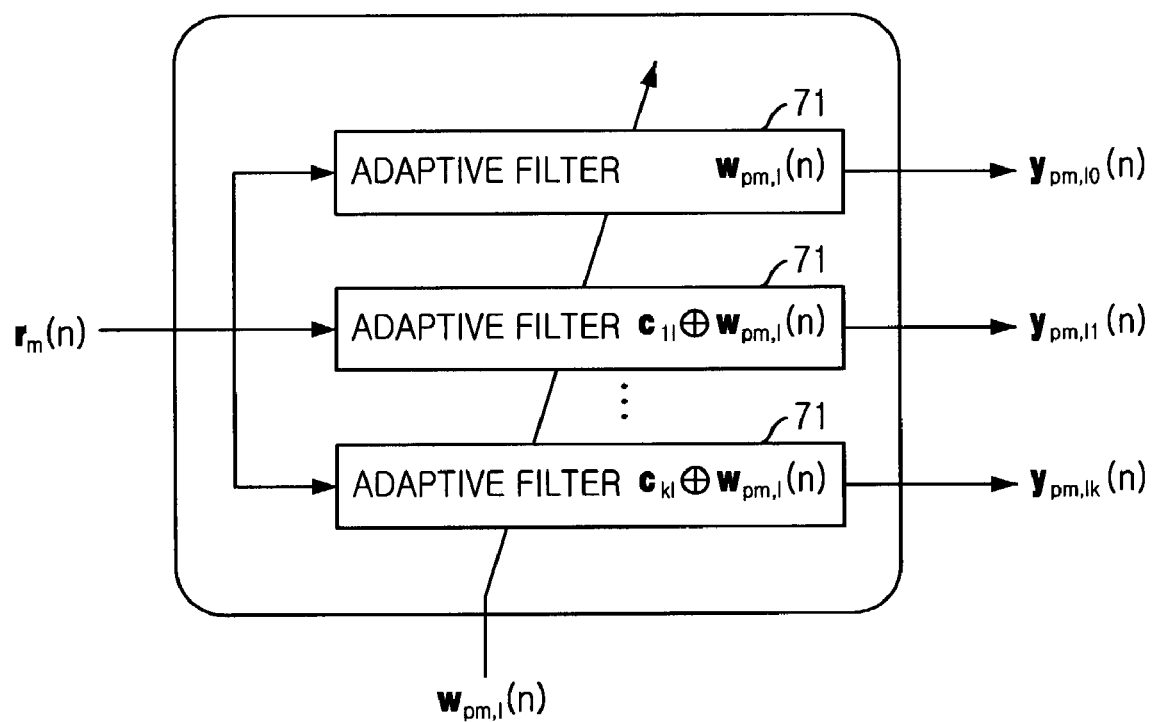
Figure 8:
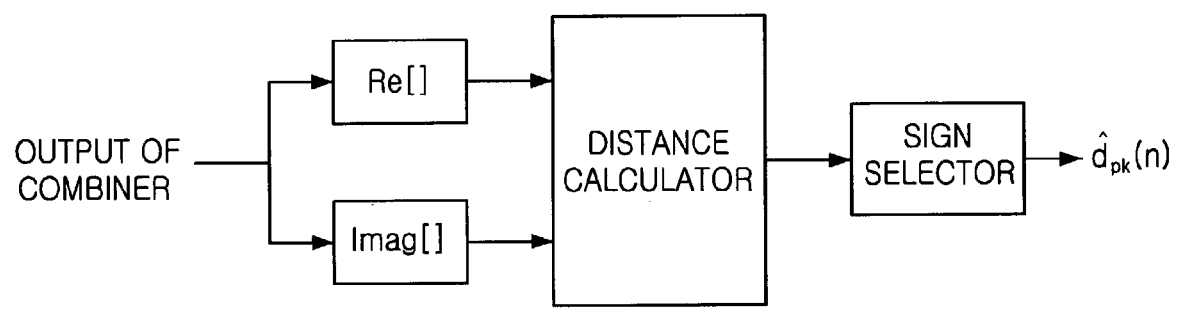
Figure 9:
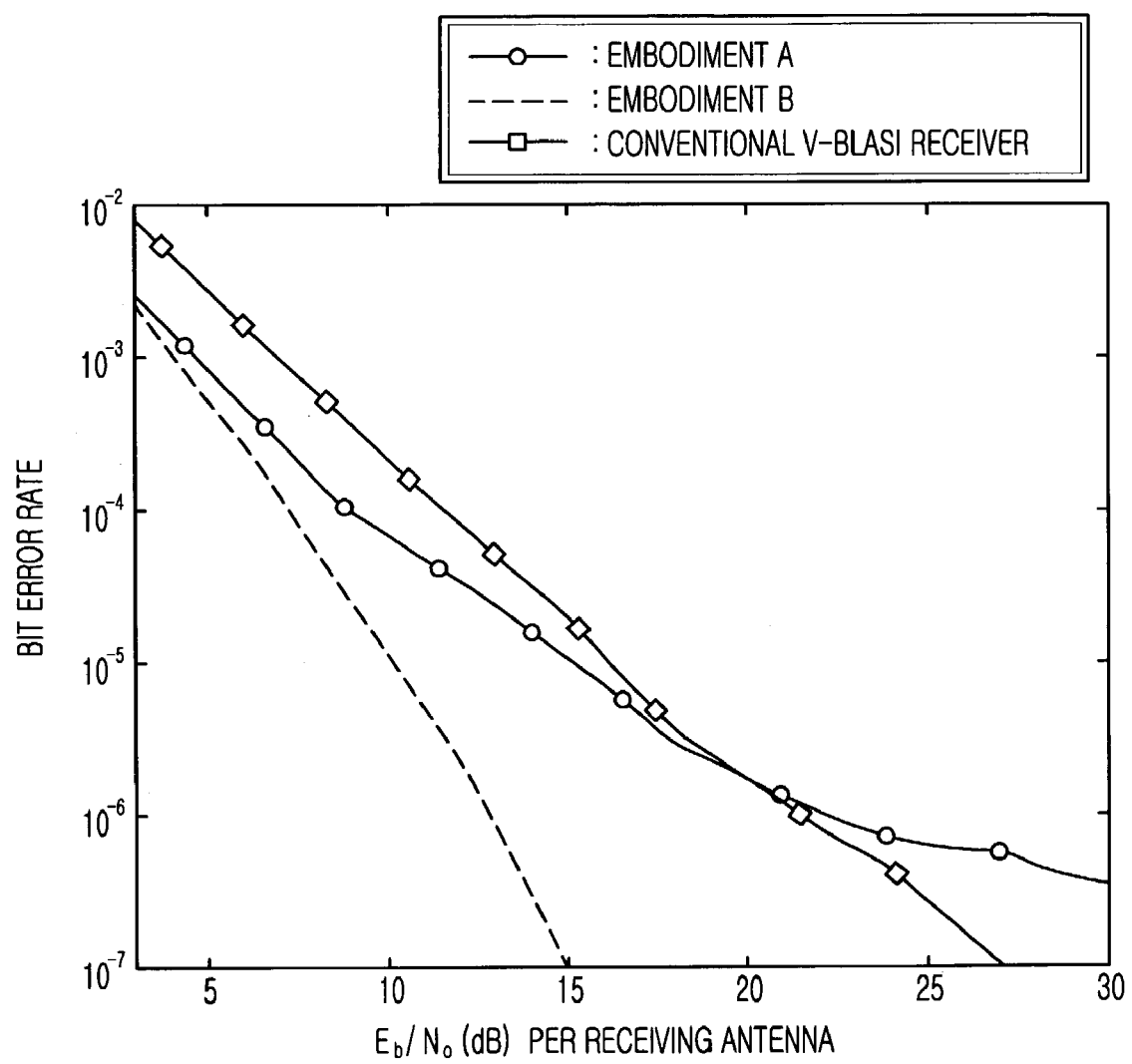
Figure 10:
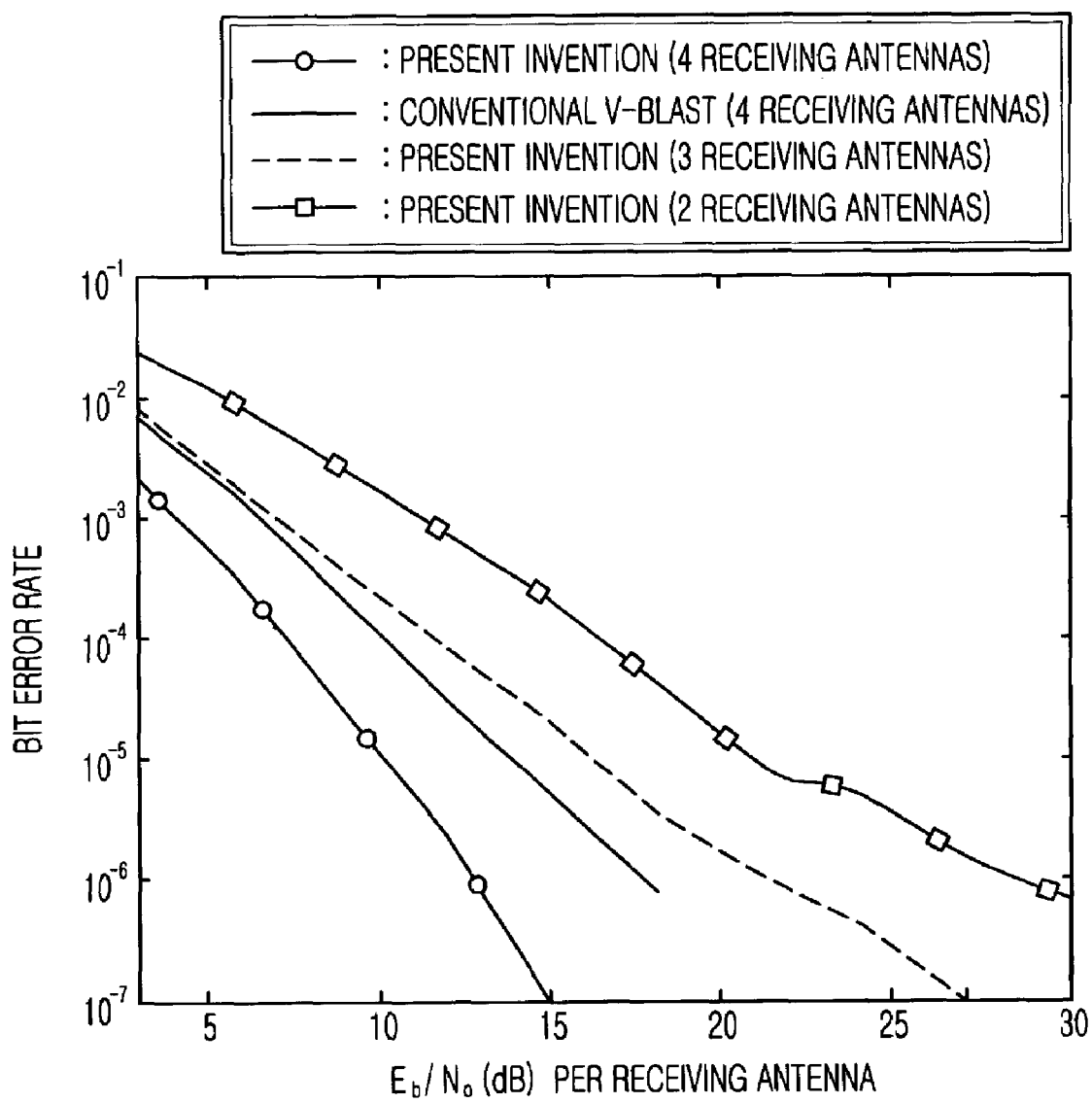
Figure 11:
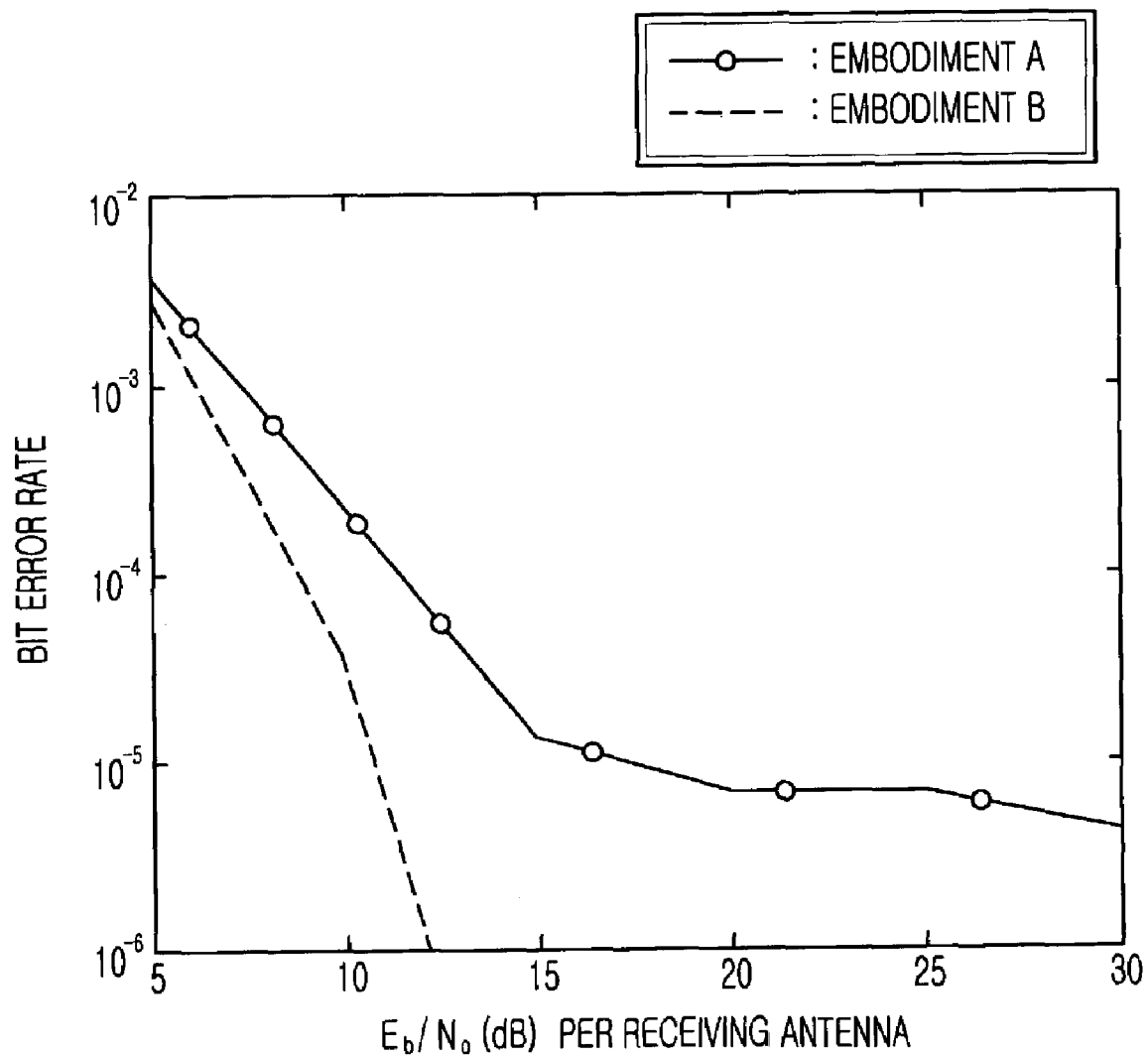
Figure 12:
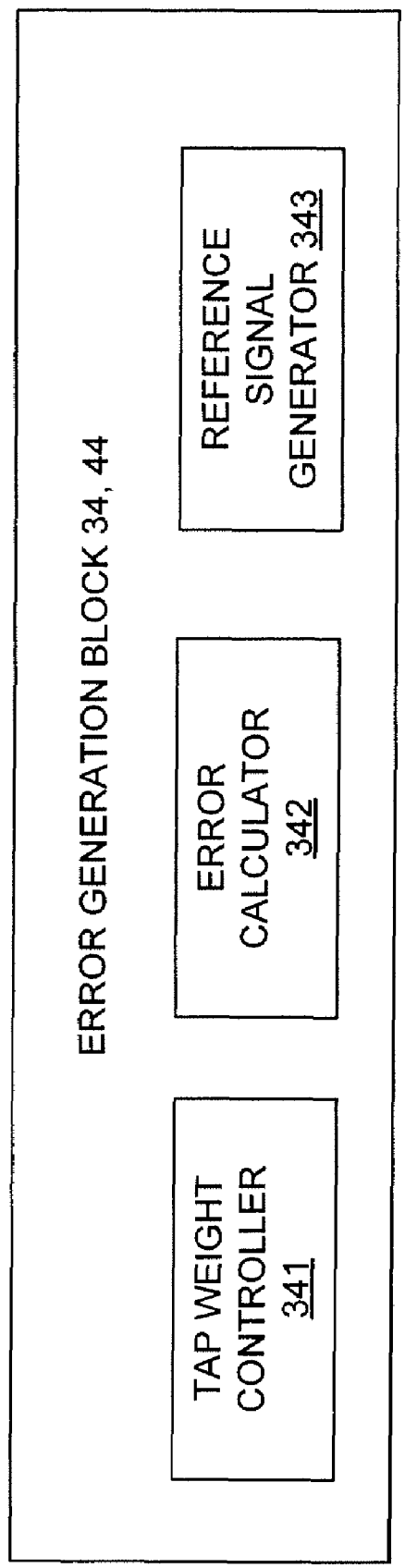

FIG. 5 is a detailed diagram illustrating an adaptive filter block 36 and 46 in FIGS. 3 and 4 in accordance with the present invention;

FIG. 6 is a diagram depicting an adaptive filter block in FIGS. 3 and 4 in accordance with another embodiment of the present invention;

FIG. 7 is a detailed diagram showing an adaptive filter bank block in accordance with a preferred embodiment of the present invention;

FIG. 8 is a detailed diagram showing a data decider in accordance with the present invention;

FIG. 9 is a graph showing a bit error rate of the present invention with 4 transmitting antennas and 4 receiving antennas in a frequency flat fading channel environment;

FIG. 10 is a graph depicting a receiving diversity gain obtained in the present invention;

FIG. 11 is a graph showing a performance of the present invention in three frequency selective fading channel environments; and FIG. 12 is a diagram showing an embodiment of the components of an error generation block in the receiver of FIG. 3 and FIG. 4.

DETAILED DESCRIPTION OF THE INVENTION

Other objects and aspects of the invention will become apparent from the following description of the embodiments with reference to the accompanying drawings, which is set forth hereinafter.

Figure 1:
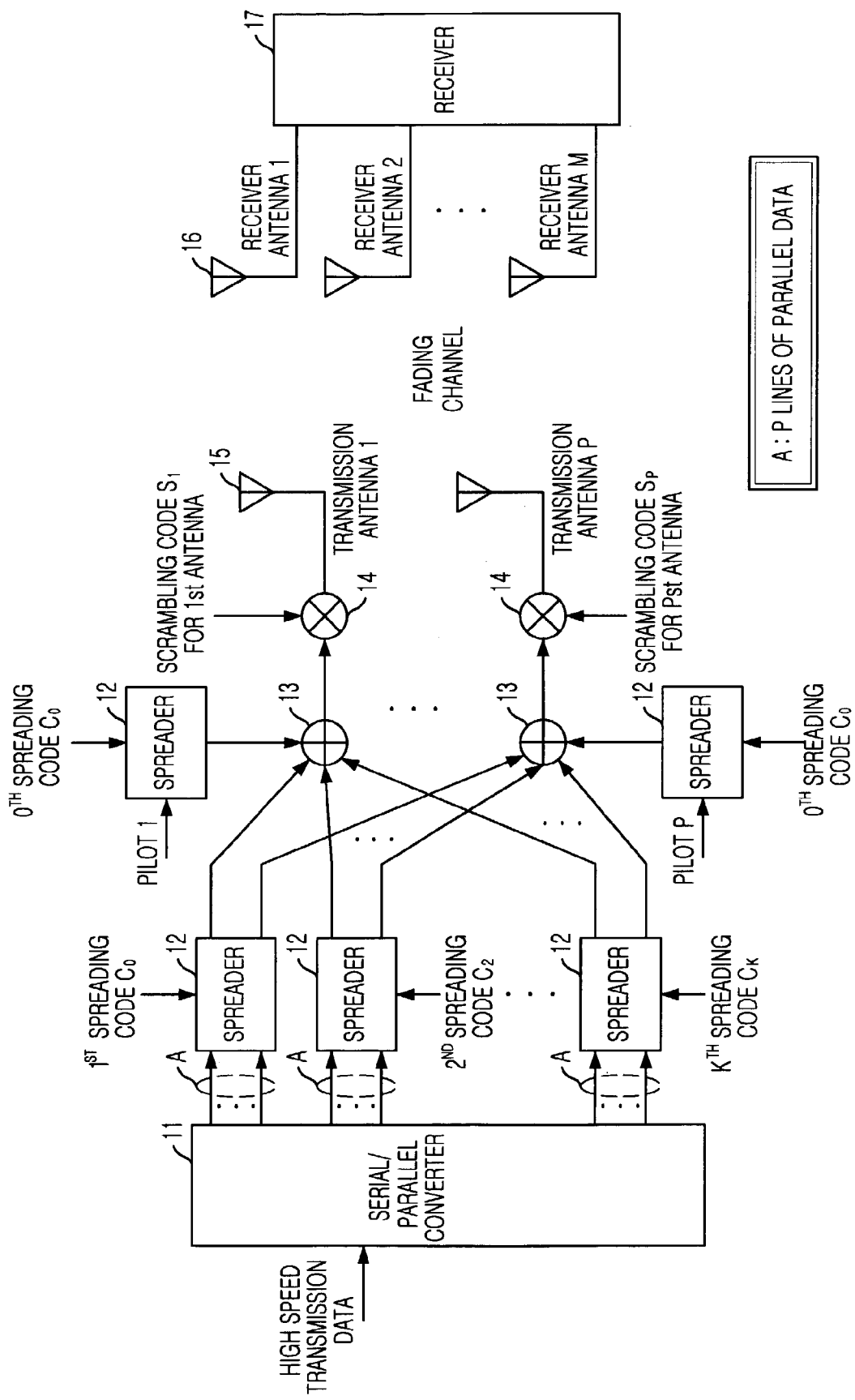
FIG. 1 is a block diagram illustrating a transmission system for a code division multiple access (CDMA) system equipped with a multiple-input multiple-output (MIMO) antenna in accordance with a preferred embodiment of the present invention.

FIG. 1 is a block diagram illustrating a transmission system for a code division multiple access (CDMA) system equipped with a multiple-input multiple-output (MIMO) antenna in accordance with a preferred embodiment of the present invention.

Referring to FIG. 1, the transmission system includes a transmitter and a receiver. The transmitter has a serial/parallel converter 11, a plurality of spreaders 12, a combiner 13, a scrambling processor 14 and a plurality of transmission antenna 15. The receiver contains a plurality of receiving antennas 16 and a receiver 17.

The MIMO antenna can simultaneously transmit data as much as multiple times of data transmitted by one antenna at once. Therefore, high speed transmission data is used as an input data of the transmitting system for explaining the present invention in below.

The serial/parallel converter 11 receives high speed transmission data and converts the high speed transmission data to K parallel data sequences. Each of K parallel data sequences includes P transmission data, wherein K is the number of spreading codes used for transmitting and P is the number of transmission antennas. The K×P transmission data are divided into P data symbols of K groups and passed to a plurality of spreaders 12.

Each of a plurality of spreaders 12 receives a corresponding parallel data sequence and spreads the parallel data sequence based on one of corresponding spreading code $C_1$ to spreading code $C_k$, which are orthogonal to the corresponding parallel data sequence. The spread data of each spreader 12 is selectively passed to one of corresponding combiners 13. In the meantime, the $0^{th}$ spreader 12 receives a pilot symbol and a $0^{th}$ spreading code. The pilot symbol is spread based on the $0^{th}$ spreading code.

Each of a plurality of combiners 13 receives the spread data from several corresponding spreaders 12 and combines the spread data and pilot symbol, wherein the pilot symbol is combined for estimating a channel according to each of the transmission antennas.

A plurality of the scrambling processors 14 receive the combined codes from the combiners 13. Each of the scrambling processors 14 scrambles the combined data by using a different scramble code according to its corresponding transmitting antenna. The scrambled data is passed to the corresponding antenna and transmitted to the receiver.

As mentioned above, using different scrambling codes according to the transmitting antenna is different from a conventional transmitter.

In the present invention, different scrambling codes are used for scrambling the combined data according to each of transmission antennas. In the conventional method for transmitting data in the MIMO antenna system, one scrambling code is used for all transmission antennas.

For explaining a difference between the conventional transmitting method using one scrambling code and the present invention using different scrambling codes, it is necessary to define a scrambling operator $\oplus$.

If there are two matrices A and B having the same dimension, the scrambling operator $\oplus$ produces a result matrix by multiplying each of entries of A with a corresponding entry of B. For example, in the case of two N×1 matrices such as a matrix $A=[a_1, \ldots, a_n]^T$ and a matrix $B=[b_1, \ldots, b_n]^T$, the result matrix of $A \oplus B$ is $[a_1 b_1, a_2 b_2, \ldots, a_n b_n]^T$. That is, $A \oplus B = [a_1 b_1, a_2 b_2, \ldots, a_n b_n]^T$.

The transmitting methods of the present invention and a conventional method are compared and explained by using an exemplary apparatus having two transmission antennas, two spreading codes $C_1$ and $C_2$ and four data $d_1$ to $d_4$.

The conventional method produces transmitting data y defined by following equation in case of frequency flat fading channel.

$$y = [(h_1 d_1 + h_2 d_2)c_1 + (h_1 d_3 + h_2 d_4)c_2] \oplus s_1 \quad \text{Eq. 1}$$

wherein $h_1$ and $h_2$ are channel parameters.

Based on $d_1$, a de-spread signal in the receiver side will be expressed by the following equation.

$$(c_1 \oplus s_1)^H y = h_1 d_1 + h_2 d_2 \quad \text{Eq. 2}$$

Referring to Eqs. 1 and 2, there is a strong interference signal $d_2$ left on data symbol after transmitting the scrambled data by one scrambling code. As shown in Eq. 2, the channel weight of each signal is different between the scrambled signal $d_1$ and the interference signal $d_2$. Therefore, based on differences in the channel weight, the interference signal can be eliminated by using a decorrelating receiving method, a minimum mean square error method or V-BLAST receiving method, which are all conventional receiving methods.

In the above mentioned case, the number of receiving antennas must be larger than the number of transmitting antennas, and the channel parameters have to be independent. Furthermore, full order of receiving diversity can not be obtained by the above conventional receiving methods generally used in the MIMO antenna system. Among them, the V-BLAST method gives the a maximum order of receiving diversity in the conventional method as M−(P−1)/2, wherein M is the number of receiving antennas and P is the number of transmitting antennas. Since the theoretical maximum order of diversity is M, there is a loss of order of diversity as much as (P−1)/2.

The interference from the data spread by different spreading codes can be eliminated by using orthogonality between codes in the case of a frequency flat fading channel, however, in case of frequency selective fading channels, orthogonality between different spreading codes is not maintained. Therefore, the interference in the frequency selective fading channel environment cannot be eliminated.

For eliminating interference in the frequency selective fading channel environment, use of a decision feedback equalizer can be considered. However, the decision feedback equalizer can not work in the code division multiple access (CDMA) environment, because the signal-to-noise ratio of a chip unit signal is less than 0 decibel (dB). Therefore, there is no conventional apparatus for MIMO DS/CDMA systems in the frequency selective fading channel environments.

In contrast, the scrambled data which is transmitted according to the present invention can be defined by the following equation.

$$y = h_1 d_1 c_1 \oplus s_1 + h_2 d_2 c_1 \oplus s_2 + h_1 d_3 c_2 \oplus s_1 + h_2 d_4 c_2 \oplus s_2 \qquad \text{Eq. 3}$$

Based on $d_1$, a de-spread signal in a receiver can be expressed as following equation.

$$(c_1 \oplus s_1)^H y = h_1 d_1 + h_2 d_2 s_1^H s_2 + h_2 d_4 (c_1 \oplus s_1)^H (c_2 \oplus s_2) \qquad \text{Eq. 4}$$

Referring to Eq. 4, $d_2$ is spread based on a different spreading code and transmitted from the same antenna compared to other signals such as $d_1$, $d_3$, $d_4$. $d_4$ is spread by an orthogonal spreading code and transmitted from a different antenna. The interference of $d_2$ is completely eliminated and the interference of $d_4$ is added. However, the size of the interference from $d_4$ is quite small because a correlation value between different scrambling codes is very small.

As shown in Eqs. 3 and 4, all data simultaneously transmitted have different signature sequences and the data in Eq. 4 are very similar to the signals in CDMA with one transmission antenna system. Therefore, various interference elimination methods for the CDMA system with one transmission antenna, like the adaptive interference suppression method disclosed by S. C. Hong, J. H. Choi, S. R. Kim and Y. H. Lee, in "Constrained MMSE-RAKE receivers for DS/CDMA systems in multipath fading channels," in Proc. VTC'02 spreing, May 2002, can be applied to detect the transmitted data from the transmitter of current invention.

Also, the present invention has excellent detection performance with simple linear calculation. In the present invention, since the power of the interference signals is very small due to the small correlation value between codes, a conventional rake receiver which can obtain complete order of diversity gain, but does not eliminate interferences, shows good detection performance.

Hereinafter, differences between the conventional method using one scrambling code and the present invention using multiple different scrambling codes in a frequency selective fading channel environment are explained as follows.

A fading channel of multipath at time t can be defined as following equation.

$$h_{(t)} = \sum_{P=1}^{P} \sum_{m=1}^{M} \sum_{l=1}^{L} h_{(t),(pml)} \delta(l - \tau_1) \qquad \text{Eq. 5}$$

In Eq. 5, $h_{(t),pml}\delta(l-\tau_l)$ is a channel weight of $l^{th}$ multipath from $p^{th}$ transmission antenna to $m^{th}$ receiving antenna. $\tau_l$ is a transmission delay of $l^{th}$ multipath and for the convenience $\tau_l$ is assumed as $(l-1)T_c$, wherein $T_c$ is a cycle of a chip.

If one assumes that a channel is not changed within a period of transmitting each code block of a parallel data sequence, the channel weight is maintained as $h_{(t),pml} = h_{(t),pml}(n)$ within $nT \leq t \leq (n+1)T$, when a symbol cycle is T. N×1 $k^{th}$ spreading code vector is $c_k = [c_{k1}, \ldots, c_{kN}]^T$ and N×1 $p^{th}$ normalized scrambling code vector is $s_p = [s_{p1}, \ldots, s_{pN}]^T$. $0^{th}$ spreading code $c_0$ is allocated to a pilot symbol and is used for spreading the pilot symbol $d_{0p}(n)$ according to p. A spreading code of $l^{th}$ path is defined as $c_{kl} = [0_{l-1}{}^T c_k{}^T, 0_{L-l}{}^T]^T$ and normalized scrambling code of $l^{th}$ path is $s_{pl} = [0_{l-1}{}^T s_p{}^T 0_{L-l}{}^T]^T$. A vector $r_m(n)$ of $n^{th}$ transmitting data sequence among outputs of a chip matching filter according to a receiving signal of $m^{th}$ receiving data is defined as following equation.

$$r_m(n) = \sum_{k=1}^{K} \sum_{p=1}^{P} \sum_{l=1}^{L} c_{kl} \oplus s_{pl} \cdot h_{pm,l}(n) \cdot d_{kp}(n) + u_m(n) = \qquad \text{Eq. 6}$$

$$\sum_{k=1}^{K} \sum_{p=1}^{P} \sum_{l=1}^{L} X_{kpl} \cdot h_{pm,l}(n) \cdot d_{kp}(n) + u_m(n)$$

$d_{kp}(n)$ is data symbol, which is transmitted from the $p^{th}$ antenna after spreading with the $k_{th}$ spreading code, $u_m(n)$ is a sum of background noise and all interference signals including interference signals of other users and neighboring symbols of the $m^{th}$ antenna. For convenience, $c_{kl} \oplus s_{pl}$ is defined as $X_{kpl}$.

As mentioned above, the transmitter of the present invention simultaneously transmits a plurality of scrambled data using multiple different scramble codes to a receiver. Advantages of applying multiple different scramble code are explained later with a receiver of the present invention by referring to FIG. 2.

Figure 2:
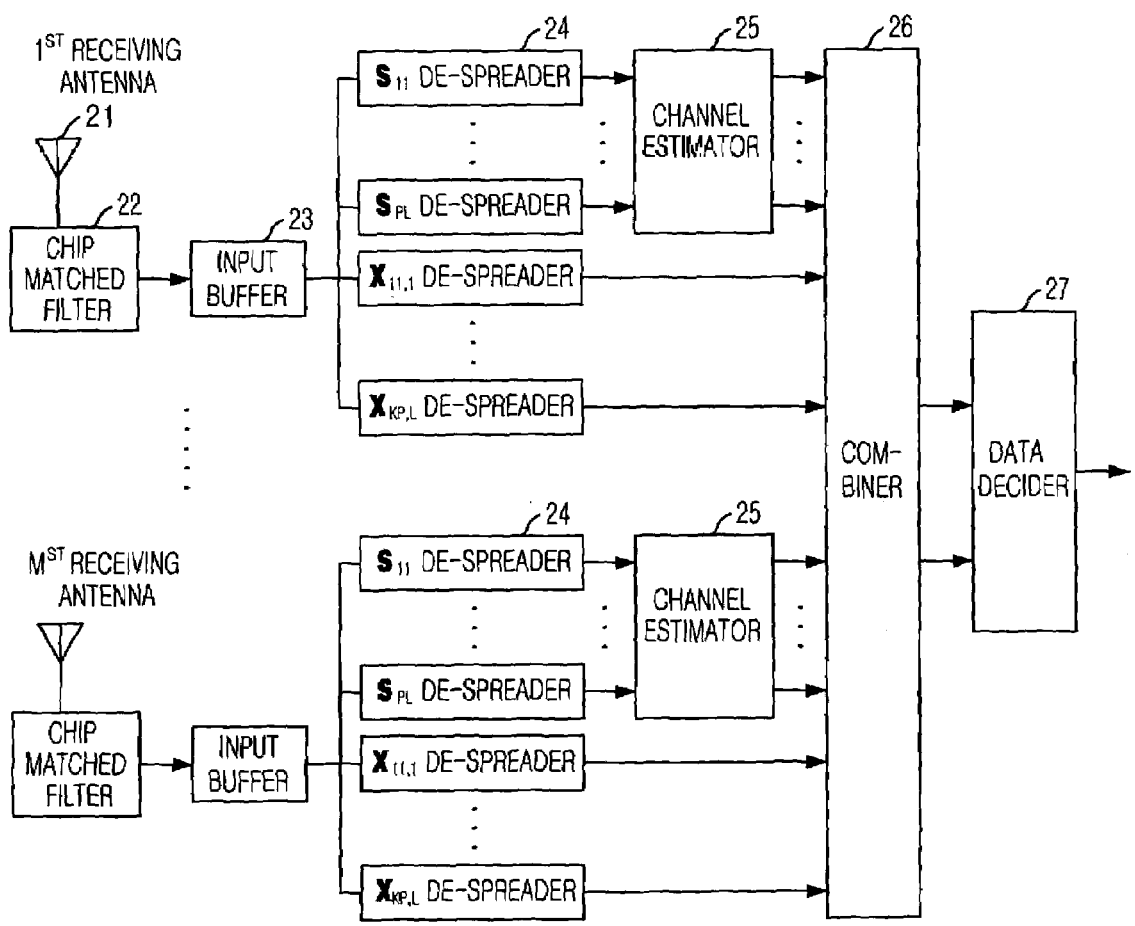
FIG. 2 is a diagram showing a receiver in accordance with the present invention. The receiver in FIG. 2 implements a conventional rake receiver by enhancing some parts of it according to the present invention.

FIG. 2 is a diagram showing a receiver in accordance with the present invention. The receiver in FIG. 2 modifies a conventional rake receiver by enhancing some parts of it according to the present invention.

Referring to FIG. 2, the receiver receives signals from a transmitter in FIG. 1 in accordance with the present invention when there are L multipath and M receiving antennas.

Referring to FIG. 2, the rake receiver includes: M chip matching filters 22; an input buffer 23; (K+1)×P×L×M de-spreaders 24 for gathering multipath energies of each transmitting data; M channel estimators 25 for estimating a channel based on the outputs of de-spreaders 23 according to a pilot signal at the receiving antenna 21; a combiner 26 for combining energies of each transmitting data based on a result of channel estimation and the output of de-spreaders and a data decider 27.

Each of de-spreaders 24 performs a calculation of a scalar product value of $r_m(n)$, a spreading code and a scrambling code in corresponding components of multipath of each transmitting data.

For example, if the de-spreader 24 for de-spreading first components of multipath of $d_{11}(n)$, which is transmitted through a first antenna and spread by a first spreading code, calculates $X_{11,1}{}^H r_m(n)$ and passes it to the combiner 26.

The channel estimator 25 estimates P×L channel parameters by using outputs of de-spreader 24.

The combiner 26 combines receiving energies of KP data symbols $d_{11}(n) \sim d_{kp}(n)$, which are simultaneously transmitted at the transmitter.

The combiner 26 generates a combined energy data as following equation with $d_{kp}(n)$ as input and outputs to the data decider 27.

$$\bar{d}_{kp}(n) = \sum_{m=1}^{M} \sum_{l=1}^{L} \hat{h}_{pm,1}^* X_{kp,l}^H r_m(n) \qquad \text{Eq. 7}$$

The data decider 27 decides data symbol closest to a constellation by using the combined energy data of Eq. 7 and generates a final estimation value of a transmitted data symbol. It is explained in detail later with reference to FIG. 8.

As mentioned above, since the transmitter in FIG. 1 transmits data using multiple different scramble codes, the receiver in FIG. 2 receives the data having very similar characteristics to data received in a conventional receiver in frequency flat fading channel environment. Therefore, various kinds of conventional receivers can be implemented for the present invention.

However, in case of using the receiver in FIG. 2, which de-spreads the received signal by using a spreading code, not only additive white Gaussian noise (AWGN) but also interference between other data may be added into the de-spread data. As a result, a receiving performance may be decreased.

For overcoming this degradation of receiving performance, an adaptive interference control method can be used. The adaptive interference control method de-spreads received signals by using an optimum adaptive filter weight based on a constrained minimum mean square error instead of using the spreading code.

FIGS. 3 and 4 show receivers in accordance with another embodiment of the present invention. The receivers in FIGS. 3 and 4 use the adaptive interference control method for increasing receiving performance by effectively eliminating interference signals.

The receivers include an input signal generating unit, an adaptive filtering unit, a channel estimating unit, a signal recovering unit, a selecting unit, a reference signal generating unit, an error calculating unit and a tap weight controlling unit.

The input signal generating unit gathers transmitted data in a received signal and passes the gathered transmitted data to the adaptive filtering unit.

The adaptive filtering unit filters a complex received signal according to a tap weight, which is controlled in a predetermined cycle, and passes filtered data to the channel estimating unit.

The channel estimating unit estimates a phase and an amplitude of a channel between one of the transmitting antennas and one of the receiving antennas based on the filtered data and estimation data resulting from estimation.

The signal recovering unit recovers the original signal from the received signal by combining the estimation data and filtered data with all components of multipath.

The selecting unit selects one of the original signal and a training data signal supplied by the receiver and outputs a selected signal.

The reference signal generating unit generates a reference signal based on the selected signal and the estimation data.

The error calculating unit calculates error between the filtered data and the reference signal by comparing the filtered data and the reference signal.

The tap weight controlling unit controls the tap weight of the adaptive filtering unit based on a constraint MMSE criterion having at least one condition.

The receivers in FIGS. 3 and 4 are identical except for a channel estimation method and an adaptive filter weight update algorithm. Therefore, each of the receivers is explained so as to focus on the differences between the two receivers.

FIG. 3 is a diagram depicting a receiver in accordance with another embodiment of the present invention.

Referring to FIG. 3, the receiver includes a receiving antenna 31, a chip matching filter 32, an input buffer 33, a error generation block 34, a simple mean channel estimator 35, an adaptive filter block 36, a combiner 37, a data decider 38 and a reference signal selector 39.

The receiving antenna 31 receives signals from the transmitter and the chip matched filter 32 correlates the received signals with channel weights to generate correlated signals. The input signal generating buffer 33 outputs vector $r_m(n)$ as a gathered transmitted data to a corresponding adaptive filter block 36 by gathering the $n^{th}$ transmitted data sequence among digital signals from the chip matching filter 32.

Each of the adaptive filtering blocks 36 includes a multi-condition filter weight updating block 51 and a plurality of adaptive filter banks 52 in FIG. 5, or includes one condition filter weight updating block 61 and a plurality of adaptive filter bank blocks 62.

In the receiver in FIG. 3, a standard adaptive filter weight is $w_{kpm,l}(n)$ for detecting a $1^{st}$ multipath component of data symbol at $m^{th}$ receiving antenna, wherein the data symbol is transmitted by being spread based on the $k^{th}$ spreading code from the $P^{th}$ transmitting antenna, a proposal object function is applies. The proposal object function is defined as following equation.

$$E[|h_{pm,l}(n)d_{kp}(n)-(c_{kl}\oplus w_{kpm,l})^H r_m(n)|^2] \text{ subject to}$$
$$w_{kpm,l}^H S_p = g_l \quad \text{Eq. 8}$$

wherein $s_p=[s_{p1},\ldots,s_{pL}]$, $g_l$ are L×1 vectors having 1 as $l^{th}$ element and 0 as all others.

The condition applied to Eq. 8 is a condition for making inter-path interference (IPI) 0 by maintaining a scalar product value of a spreading code of $l^{th}$ multipath and a scalar product value of the adaptive filter weight and spreading code of each multipath as 1 and maintaining an scalar product value of other multipath components as 0.

By eliminating the interference between multipath based on the condition, the receiving performance is increased since channel is estimated without bias although the simple mean channel estimation method is used based on the adaptive filter's output.

By using Lagrangian multiplier, $w_{kpm,l}(n)$ can be calculated from Eq. 8, wherein $w_{kpm,l}(n)$ minimizes the object function Eq. 8. It is expressed as following equation.

$$w_{kpm,l}^0 = R_m^{-1} S_p (S_p^H R_m^{-1} S_p) g_l \quad \text{Eq. 9}$$

In Eq. 9, $R_m=E[r_m(n)r_m^H(n)]$. Therefore, Eq. 9's $w_{kpm,l}^0$ can be used as $w_{pm,l}(n)$ by eliminating k and a speed of convergence of adaptive filter is increased by updating adaptive filter weight by combining error signals of all k.

The error generation block 34 calculates errors between a reference signal and an output of the corresponding adaptive filter, which is a filtered data. The calculated errors are passed to the filter weight updating blocks 51 or 61 of the adaptive filter block 36. An error signal vector of $l^{th}$ path of $m^{th}$ receiving antenna is $e_{ml}(n)=[e_{1m,l}{}^T,e_{2m,l}{}^T,\ldots,e_{Pm,l}{}^T]^T$ and the error signal vector of data of each transmitting antenna is $e_{ml}(n)=[e_{0pm,l},e_{1pm,l},\ldots,e_{kpm,l}]^T$, wherein p, m, l, k is expressed as following equation.

$$e_{kpm,l}(n) = \hat{h}_{pm,l}(n) d_{kp}(n) - (c_{kl} \oplus w_{pm,l}(n))^H r_m(n) \quad \text{Eq. 10}$$

In Eq. 10, $\hat{h}_{pm,l}(n)$ is an estimated value of the $l^{th}$ multipath channel between the $p^{th}$ transmitting antenna and the $m^{th}$ receiving antenna. It is passed from the simple mean channel estimation block 35 in FIG. 3.

The adaptive filter block 36 updates adaptive filter weight by using following equation according to each transmitting antenna index $p(1 \leq p \leq P)$.

$$w_{pm,l}(n+1) = w_{pm,l}(n) + \mu P_{s_p}^\perp \left( \sum_{k=0}^{K} e_{kpm,l}^*(n) r_m(n) \right) \quad \text{Eq. 11}$$

In Eq. 11, $P_{s_p}^\perp$ is defined as $I - s_P(s_P^H s_P)^{-1} s_P^H$ and it is an orthogonal projection vector, which is projected to a space orthogonal to $s_p$.

The adaptive filter banks 52 or 62 in the adaptive filter block 36 scramble the spreading code of symbol corresponding to simple adaptive filter weight as an adaptive filter weight for a spread data. As a result, $y_{pm,l}(n) = [y_{0pm,l}\ y_{1pm,l}\ \cdots,$ $y_{Kpm,l}]^T$ is outputted. A vector gathering outputs of the adaptive filter bank for each transmitting antenna is defined as $y_{m,l}(n)=[y_{1pm,l}{}^T\ y_{2pm,l}{}^T\ \ldots,y_{pm,l}{}^T]^T$.

The receiver in FIG. 3 estimates a channel by using below equation which represents a simple mean channel estimation method.

$$\hat{h}_{pm,l}(n) = \frac{1}{2N_p}\sum_{i=1}^{N_p} d^*_{0p}(n-i)w^H_{pm,l}(n-i)r_m(n-i) \quad \text{Eq. 12}$$

Referring to Eq. 12, the final channel estimation value is calculated by computing a mean of temporally channel estimation value based on a plurality of pilot symbols for reducing the effect of noise. $N_p$ is the number of pilot signals used for estimating the channel.

The final channel estimation value calculated by Eq. 12 is unbiased and it is a maximum likelihood channel estimation value under a condition of estimating the channel by using an adaptive filter output, which has a plurality of conditions. In the Eq. 12, $d_{0p}(n)$ is a pilot symbol transmitted from $p^{th}$ antenna.

The combiner 37 generates a decision variable for each of KP data symbols $d_{11}(n)$~$d_{KP}(n)$. For $d_{KP}(n)$, the combiner 37 generates a combined signal and the combined signal is outputted to the data decider 38. The combined signal is expressed as following equation.

$$\bar{d}_{kp}(n) = \sum_{m=1}^{M}\sum_{l=1}^{L} \hat{h}^*_{pm,l}(c_{ki}\oplus w_{pm,l})^H r_m(n) \quad \text{Eq. 13}$$

The data decider 38 decides data symbol closest to a constellation by using the combined signal and outputs a final estimation value of the data symbol.

The reference signal selector 39 receives the final estimation value and generates a pilot combined signal by combining the final estimation value with the pilot symbol. The pilot combined signal is passed to the channel estimator 35 and error generation block 34.

FIG. 4 is a diagram showing a receiver in accordance with another preferred embodiment of the present invention.

Referring to FIG. 4, the receiver includes a plurality of receiving antennas 41, a chip matching filter 42, an input buffer 43, an error generation block 44, a maximum likelihood channel estimator 45, an adaptive filter block 46, a combiner 47, a data decider 38 and reference signal selector 39.

As mentioned above, the receiver in FIG. 4 is very similar to the receiver in FIG. 3, therefore, overlapped elements are not explained and omitted.

In the receiver in FIG. 4, a standard adaptive filter weight is $w_{kpm,l}(n)$ for detecting the $l^{th}$ multipath components of a data symbol at the $m^{th}$ receiving antenna, wherein the data symbol is transmitted by being spread based on the $k^{th}$ spreading code from the $P^{th}$ transmitting antenna, a proposal object function is applied. The proposal object function is defined as following equation.

$$E[|h_{pm,l}(n)d_{kp}(n)-(c_{kl}\oplus w_{kpm,l})^H r_m(n)|^2] \text{ subject to } w_{kpm,l}S_{pl}=1 \quad \text{Eq. 14}$$

A condition applied to Eq. 14 is that a scalar product value of an adaptive filter weight and a spreading code of $l^{th}$ multipath is maintained as 1. There is no condition for a scalar product value of another multipath's code. An output of the adaptive filter has multipath IPI.

By using Lagrangian multiplier, $w_{kpm,l}(n)$ can be calculated from Eq. 14, wherein $w_{kpm,l}(n)$ minimizes the object function Eq. 14. It is expressed as following equation.

$$w^0_{kpm,l} = \frac{R_m^{-1}s_{pl}}{s^H_{pl}R_m^{-1}s_{pl}} + \sum_{\substack{i=1\\i\neq l}}^{L} \frac{h^*_{pm,l}h_{pm,i}(s^H_{pl}R_m^{-1}s_{pl}R_m^{-1}s_{pi} - s^H_{pl}R_m^{-1}s_{pi}R_m^{-1}s_{pl})}{s^H_{pl}R_m^{-1}s_{pl}} \quad \text{Eq. 15}$$

As shown in Eq. 15, $w_{kpm,l}(n)$ is identical about p, m, l without consideration of a spreading code. That is, Eq. 15 shows $w_{kpm,l}(n)$ in a fixed channel, which varied very slowly.

If the channel is changed quickly, then $w_{kpm,l}(n)$ is expressed as following equation.

$$w^0_{kpm,l} = \frac{R_m^{-1}s_{pl}}{s^H_{pl}R_m^{-1}s_{pl}} \quad \text{Eq. 16}$$

Eq. 16 has optimum filter weight therefore, $w_{kmp,l}{}^0(n)$ can be rewritten as $w_{kpm,l}(n)$ and excessive mean square error can be reduced corresponding to the number of spreading codes by updating the adaptive filter weight $w_{kpm,l}(n)$ by adaptively combining the error signals based on data transmitted with spreading code as a reference signal.

FIG. 12 is a diagram illustrating error generation block 34, 44 in FIG. 3 and FIG. 4 in accordance with the present invention. Error generation block 34, 44 includes a tap weight controller 341, an error calculator 342 and a references signal generator 343. FIG. 5 is a detailed diagram illustrating an adaptive filter block 36 and 46 in FIGS. 3 and 4 in accordance with the present invention.

Referring to FIG. 5, the adaptive filter block 36 or 46 includes a multi-condition filter weight updating unit 51 and a plurality of adaptive filter banks 52.

The multi-condition filter weight updating unit 52 updates the adaptive filter weight based on the error vector $e_{ml}(n)$ from the error generation block 34 or 44 and passes it to the corresponding adaptive filter bank 52.

The adaptive filter bank 52 processes $w_{pm,l}(n)$ from the multi-condition filter updating block 51 and $r_m(n)$ from the input buffer 33 and 43 and generates $y_{pm,l}(n)$.

FIG. 6 is a diagram depicting an adaptive filter block in FIGS. 3 and 4 in accordance with another embodiment of the present invention.

Referring to FIG. 6, the adaptive filter block is identical to the adaptive filter block in FIG. 5 except a one-condition filter weight updating block 61 is operated by one condition weight update algorithm.

The one condition filter weight updating block 61 is explained in detail as followings.

The one-condition filter weight updating block 61 updates the adaptive filter weight of each transmitting antenna p(1≦p≦P) based on below equation.

$$w_{pm,l}(n+1) = w_{pm,l}(n) + \mu P_{spl}^{\perp}\left(\sum_{k=0}^{K} e_{kpm,l}^{*}(n)r_m(n)\right) \quad \text{Eq. 17}$$

$P_{s\,pl}^{\perp}$ is defined as $I-s_{pl}s_{pl}^{H}/(s_{pl}^{H}s_{pl})$ and it is an orthogonal projection matrix which projects all vectors to a space orthogonal to $s_{pl}$. If the adaptive filter weight is updated by using Eq. 17, there is a deviation on a channel estimation value as following equation in case of Eq. 12 is used for estimating channel, wherein Eq. 12 is a simple mean channel estimate method.

$$E[\hat{h}_{pm,l}(n)] = h_{pm,l}(n) + \sum_{\substack{l'=1 \\ l' \neq l}}^{L} h_{pm,l}w_{pm,l}^{H}(n)s_{pl} \quad \text{Eq. 18}$$

The deviation of the channel estimation value decreases data detection performance.

For overcoming this problem, a maximum likelihood channel estimation method is used for gaining a biased channel estimation value. The maximum likelihood channel estimation method is expressed as following equation.

$$\begin{bmatrix} \hat{h}_{pm,1} \\ \hat{h}_{pm,2} \\ \cdot \\ \cdot \\ \cdot \\ \hat{h}_{pm,L} \end{bmatrix} = \frac{1}{N_p} \sum_{i=1}^{N_p} \begin{bmatrix} 1 & w_{pm,1}^H(n-iQ)s_{p2} & ,\ldots, & w_{pm1}^H(n-i)s_{pL} \\ w_{pm,2}^H(n-i)s_{p1} & 1 & ,\ldots, & w_{pm,2}^H(n-i)s_{pL} \\ \cdot & \cdot & ,\ldots, & \cdot \\ \cdot & \cdot & ,\ldots, & \cdot \\ \cdot & \cdot & ,\ldots, & \cdot \\ w_{pm,L}^H(n-i)s_{p1} & w_{pm,L}^H(n-i)s_{p2} & ,\ldots, & 1 \end{bmatrix}^{-1} \quad \text{Eq. 10}$$

$$\cdot d_{0p}^{*}(n-i)w_{pm}^{H}r_m(n-i)$$

wherein $$W_{pm}^H = [\,w_{pm,1} \quad w_{pm,2} \quad ,\ldots, \quad w_{pm,L}\,].$$

FIG. 7 is a detailed diagram showing an adaptive filter bank block in accordance with a preferred embodiment of the present invention.

Referring to FIG. 7, the adaptive filter bank block includes a plurality of adaptive filters. The adaptive filter receives a standard adaptive filter weight from the filter weight updating block 51 or 61 and sets the standard adaptive filter weight as an adaptive filter weight for a pilot symbol. Also, each spreading code is scrambled and set as an adaptive filter weight for transmission data.

FIG. 8 is a detailed diagram showing a data decider in accordance with the present invention.

The data decider decides which data symbol is closest to a constellation by using a combined signal of Eq. 7 and outputs a final estimation value of a transmitted data symbol.

FIG. 9 is a graph showing a bit error rate of the present invention with 4 transmitting antennas and 4 receiving antennas in a frequency flat fading channel environment.

Referring to FIG. 9, the present invention has better detection performance than a conventional V-BLAST receiver. This is because the receiver of the present invention can use full diversity gain. In case of embodiment A, the performance is getting lower than the conventional V-BLAST receiver since the embodiment A does not eliminate interference cause by multi-users.

FIG. 10 is a graph depicting a receiving diversity gain obtained in the present invention.

Referring to FIG. 10, in case of conventional V-BLAST transmission system, 2.5 order of diversity when four receiving antennas and four transmitting antennas are used.

As shown in FIG. 10, a characteristic line of the conventional V-BLAST transmission system is located in between a characteristic line of the present invention with three receiving antennas and a characteristic line of the present invention with two receiving antennas. It shows that the present invention obtains order of diversity proportional to the number of receiving antennas.

FIG. 11 is a graph showing a performance of the present invention in three frequency selective fading channel environment.

Four transmitting antennas and two receiving antennas are used in the present invention. Since there is no V-BLAST system for DS/CDMA system in frequency selective fading channels, the graphs shows only performance of the present invention. As shown in FIG. 11, the present invention has excellent data detection performance.

As mentioned above, the present invention can obtain diversity gain of a theoretical maximum order of receiving diversity.

The present invention effectively transmits and receives data in the DS/CDMA system equipped with a MIMO antenna.

Also, the present invention has excellent detection performance by receiving data with full order of diversity, which is a multiple of the number of receiving antennas and the number of multipath, without complicated operations such as a decision feed equalizer.

Furthermore, the present invention can eliminate interference between data simultaneously transmitted through different antennas by using various conventional receiving methods developed for one transmission antenna with simple modification of the method.

While the present invention has been described with respect to certain preferred embodiments, it will be apparent to those skilled in the art that various changes and modifications may be made without departing from the scope of the invention as defined in the following claims.

The invention claimed is:

1. A receiving apparatus for a direct sequence (DS)/code division multiple access (CDMA) system equipped with a multiple-input multiple-output (MIMO) antenna system, comprising:

a plurality of receiving antennas for receiving a signal transmitted from a transmitter;

input signal generating means for gathering transmitted data in the received signal and outputting the gathered transmitted data;

adaptive filtering means for filtering a complex received signal according to a tap weight which is controlled in a predetermined cycle, and outputting filtered data;

channel estimating means for estimating a phase and an amplitude of a channel between one of a plurality of transmitting antennas and one of a plurality of receiving antennas based on the filtered data, and outputting an estimation data as a result of estimation;

signal recovering means for recovering an original signal from the received signal by combining the estimation data and filtered data with all components of multipath;

selecting means for selecting one of the original signal and a training data signal supplied by the receiver and outputting a selected signal;

reference signal generating means for generating a reference signal based on the selected signal and the estimation data;

error calculating means for calculating error between the filtered data and the reference signal by subtracting the filtered data from the reference signal multiplied by the estimation data; and tap weight controlling means for controlling the tap weight of the adaptive filtering unit based on a constraint minimum mean square error (MMSE) criterion having at least one condition.

2. A transmission and receiving apparatus for a direct sequence (DS)/code division multiple access (CDMA) system equipped with a multiple-input multiple-output (MIMO) antenna system, comprising:

serial to parallel converting means for converting serially inputted high speed data to parallel data sequences;

spreading means for spreading the parallel data sequences based on spreading codes, which are orthogonal to each other, to generate a plurality of spread data sequences;

pilot signal spreading means for spreading pilot signals to generate a plurality of spread pilot signals;

combining means for combining each of the spread data sequences and each of the spread pilot signals, to generate a plurality of combined data sequences;

scrambling means for scrambling each of the combined data sequences by using a different scrambling code in order to generate scrambled data;

a plurality of transmitting antennas for independently transmitting the scrambled data;

a plurality of receiving antennas for receiving the scrambled data transmitted from the transmitting antennas;

input signal generating means for gathering transmitted data in the received signal and outputting the gathered transmitting data;

adaptive filtering means for filtering a complex received signal according to a tap weight which is controlled in a predetermined cycle, and outputting filtered data;

channel estimating means for estimating a phase and an amplitude of a channel between one of the transmitting antennas and one of the receiving antennas based on the filtered data, and outputting estimation data as a result of estimation;

signal recovering means for recovering an original signal from the received signal by combining the estimation data and filtered data with all components of multipath;

selecting means for selecting one of the original signal and a training data signal supplied by the receiver, and outputting a selected signal;

reference signal generating means for generating a reference signal based on the selected signal and the estimation data;

error calculating means for calculating error between the filtered data and the reference signal by subtracting the filtered data from the reference signal multiplied by the estimation data; and tap weight controlling means for controlling the tap weight of the adaptive filtering unit based on a constraint minimum mean square error (MMSE) criterion having at least one condition.

* * * * *